United States Patent
Nishiya et al.

(10) Patent No.: US 8,851,993 B2
(45) Date of Patent: Oct. 7, 2014

(54) GAME DEVICE, GAME METHOD, NON-TRANSITORY STORAGE MEDIUM ENCODED WITH COMPUTER READABLE PROGRAM FOR CONTROLLING GAME DEVICE, AND GAME SYSTEM, ALLOWING FOR FUN IN TACTICS AND ENHANCED ZEST OF GAME

(75) Inventors: Shuichiro Nishiya, Chuo-ku (JP); Tatsumitsu Watanabe, Chuo-ku (JP)

(73) Assignee: Nintendo Co., Ltd., Kyoto (JP)

(*) Notice: Subject to any disclaimer, the term of this patent is extended or adjusted under 35 U.S.C. 154(b) by 333 days.

(21) Appl. No.: 13/315,413

(22) Filed: Dec. 9, 2011

(65) Prior Publication Data
US 2012/0309521 A1 Dec. 6, 2012

(30) Foreign Application Priority Data
Jun. 3, 2011 (JP) ................................ 2011-125134

(51) Int. Cl.
*A63F 13/00* (2014.01)
*A63F 9/24* (2006.01)
*A63F 13/40* (2014.01)

(52) U.S. Cl.
CPC ......... *A63F 13/10* (2013.01); *A63F 2300/6036* (2013.01); *A63F 2300/61* (2013.01)
USPC ........ 463/36; 463/1; 463/10; 463/15; 463/16; 463/22; 463/30; 463/42

(58) Field of Classification Search
USPC .................... 463/1, 10, 15–16, 22, 42, 30, 36
See application file for complete search history.

(56) References Cited

U.S. PATENT DOCUMENTS

| | | | |
|---|---|---|---|
| 6,364,314 B1* | 4/2002 | Canterbury | 273/274 |
| 7,713,126 B2* | 5/2010 | Suzuki et al. | 463/31 |
| 2002/0075264 A1* | 6/2002 | Iizuka et al. | 345/427 |
| 2011/0039620 A1* | 2/2011 | Hashimoto | 463/36 |

FOREIGN PATENT DOCUMENTS

JP 2007-125250 5/2007

OTHER PUBLICATIONS

Hasbro, "Monopoly: Property Trading Game from Parker Brothers", 2005, Hasbro, p. 1-2.*

* cited by examiner

*Primary Examiner* — William Brewster
*Assistant Examiner* — Ryan Hsu
(74) *Attorney, Agent, or Firm* — Nixon & Vanderhye P.C.

(57) ABSTRACT

An exemplary embodiment provides a game device. The game device includes an indication acceptance unit for accepting an indication for determining an amount of movement, a movement amount determination unit for determining an amount of movement on the prescribed route, a position updating unit for updating positions of all player characters on the route in accordance with the determined amount of movement, and an event processing unit for executing an event on the player character and the indication acceptance unit includes a normal indication acceptance unit for accepting a normal indication for determining a normal amount of movement and a special indication acceptance unit for accepting a special indication for determining an amount of movement different from normal, which is executed alternative to the normal indication and of which number of permitted times of issuance by the plurality of player characters is limited.

10 Claims, 13 Drawing Sheets

FIG.11
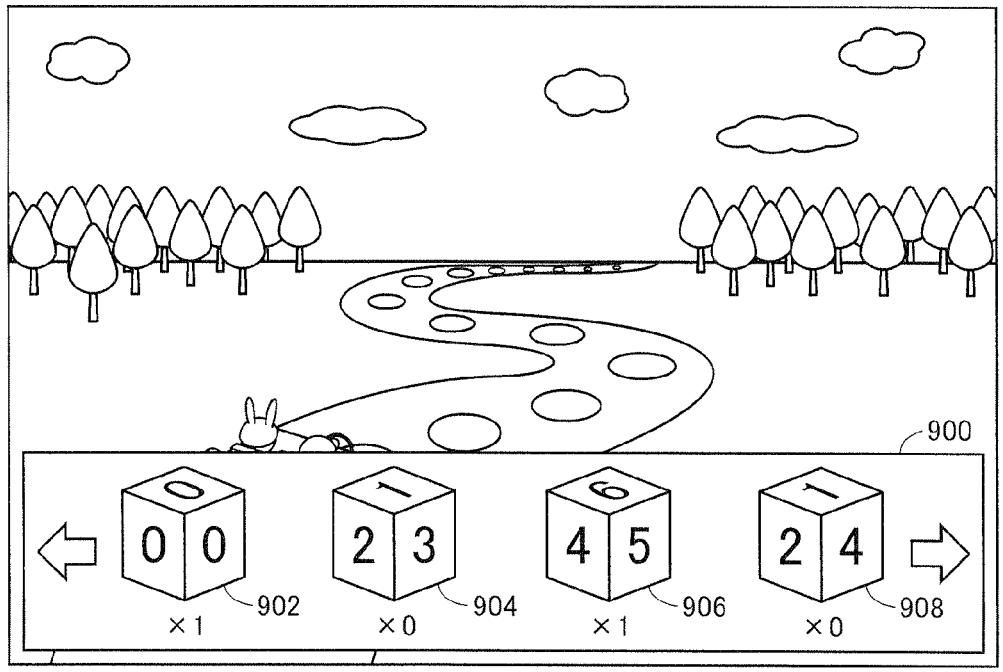
FIG.12
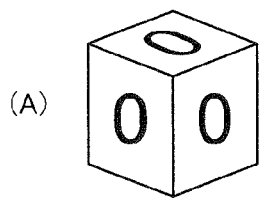
(A) ZERO DIE
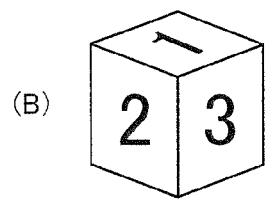
(B) 123 DIE
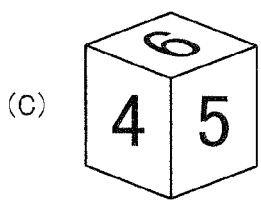
(C) 456 DIE
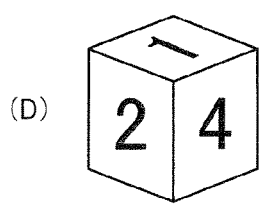
(D) SLOW DIE
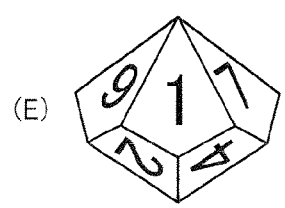
(E) 10-FACE DIE

|  | ACQUIRED STAR(S) | RANKING |
|---|---|---|
| CHARACTER A | 20 | FIRST PLACE |
| CHARACTER B | 18 | SECOND PLACE |
| CHARACTER C | 10 | THIRD PLACE |
| CHARACTER D | 2 | FOURTH PLACE |

GAME DEVICE, GAME METHOD, NON-TRANSITORY STORAGE MEDIUM ENCODED WITH COMPUTER READABLE PROGRAM FOR CONTROLLING GAME DEVICE, AND GAME SYSTEM, ALLOWING FOR FUN IN TACTICS AND ENHANCED ZEST OF GAME

This nonprovisional application is based on Japanese Patent Application No. 2011-125134 filed with the Japan Patent Office on Jun. 3, 2011, the entire contents of which are hereby incorporated by reference.

FIELD

The invention generally relates to a game device, a game method, a program for controlling a game device, and a game system.

BACKGROUND AND SUMMARY

A game in which a plurality of player characters sequentially cast a die in a game space including a route constituted of a plurality of cells, the player character moves on the route in accordance with a cast shown by the die, and some kind of event occurs at the time of movement has been known as a conventional game device.

In the game of this type, the plurality of player characters move by the number corresponding to a cast shown. Namely, the player characters move on the route independently of one another.

Namely, movement of each player character does not directly affect movement of another player character, but occurrence of an event or the like indirectly affects the same.

Therefore, since movement of the own player character does not directly affect movement of another player character, less tactics is used.

An exemplary embodiment provides a game device, a game method, a program for controlling a game device, and a game system, allowing for fun in tactics and enhanced zest of a game.

An exemplary embodiment provides a game device. The game device is for playing a game in which a plurality of player characters move on a prescribed route in a game space displayed on a display. The game device includes an indication acceptance unit for accepting an indication for determining an amount of movement on the prescribed route directed to a player character among the plurality of player characters, a movement amount determination unit for determining an amount of movement on the prescribed route when the indication acceptance unit accepts the indication, a position updating unit for updating positions of the player character for which the indication has been accepted in the indication acceptance unit and of all other player characters on the prescribed route in accordance with the amount of movement determined by the movement amount determination unit, and an event processing unit for performing event processing at least on the player character for which the indication has been accepted in the indication acceptance unit in accordance with the position to which the player character has been moved. The indication acceptance unit includes a normal indication acceptance unit for accepting a normal indication for determining a normal amount of movement and a special indication acceptance unit for accepting a special indication for determining an amount of movement different from normal, which is executed alternative to the normal indication and of which number of permitted times of issuance by the plurality of player characters is limited.

According to the exemplary embodiment, since positions of the player character for which the indication has been accepted and of all other player characters are updated, movement of own player character directly affects movement of other player characters and hence zest of a game can be enhanced by tactics in connection with movement. In addition, at the time of movement, since a special indication of which number of permitted times of issuance by the plurality of player characters is limited is accepted, zest of a game can further be enhanced by using tactics in connection with execution of the special indication.

In an exemplary embodiment, the amount of movement is the number of cells provided successively on the prescribed route, through which movement is made.

According to the exemplary embodiment, since the cells are provided on the prescribed route, an amount of movement can readily be grasped at the time of using tactics and zest of a game can be enhanced.

In an exemplary embodiment, the event processing unit includes an item event processing unit for performing event processing for acquiring or losing a prescribed item and a winning and losing determination event processing unit for performing event processing in which winning and losing is determined based on the number of the prescribed items acquired by each of the plurality of player characters.

According to the exemplary embodiment, since event processing for acquiring or losing a prescribed item and event processing for determining winning and losing based on the number of acquired items are performed, tactics in connection with acquirement or loss of an item is used and zest of a game can be enhanced.

In an exemplary embodiment, the event processing unit includes a special indication acquirement event processing unit for performing event processing allowing use of the special indication of which number of permitted times of issuance is set as limited.

According to the exemplary embodiment, since event processing allowing use of a special indication of which number of permitted times of issuance is set as limited is performed, zest of a game can be enhanced by tactics in connection with the special indication.

In an exemplary embodiment, the normal indication corresponds to an indication for determining an amount of movement corresponding to a value of a cast shown by using a normal die, and the special indication corresponds to an indication for determining an amount of movement corresponding to a cast shown by using a special die different from the normal die.

According to the exemplary embodiment, the special die is set to show only a value within a prescribed range narrower than a range of values determined by the normal die.

In an exemplary embodiment, the special die is set to be able to show a value not included in the values determined by the normal die.

In an exemplary embodiment, the special die is set to show only a value of 0.

According to the exemplary embodiment, since the special die is set to be different in cast from a normal die, tactics in connection with use of the special die is used and zest of a game can be enhanced.

For example, in a case of the special die set to show only a value of "0", tactics with which own player character is not moved but a player character next in the order is moved is used and zest of a game can be enhanced.

In an exemplary embodiment, the event processing unit further includes a mini game event processing unit for performing event processing for executing a mini game in which the plurality of player characters compete against one another as they are operated.

According to the exemplary embodiment, zest of a game can be enhanced by executing a mini game in which players compete against one another.

An exemplary embodiment provides a game method for playing a game in which a plurality of player characters move on a prescribed route in a game space displayed on a display. The game method includes the steps of accepting an indication for determining an amount of movement on the prescribed route directed to a player character among the plurality of player characters, determining an amount of movement on the prescribed route when the indication is accepted, updating positions of the player character for which the indication has been accepted and of all other player characters on the prescribed route in accordance with the determined amount of movement, and performing event processing at least on the player character for which the indication has been accepted in accordance with the position to which the player character has been moved, and the step of accepting an indication includes the steps of accepting a normal indication for determining a normal amount of movement and accepting a special indication for determining an amount of movement different from normal, which is executed alternative to the normal indication and of which number of permitted times of issuance by the plurality of player characters is limited.

According to the exemplary embodiment, since positions of the player character for which the indication has been accepted and of all other player characters are updated, movement of own player character directly affects movement of other player characters and hence zest of a game can be enhanced by tactics in connection with movement. In addition, at the time of movement, since a special indication of which number of permitted times of issuance by the plurality of player characters is limited is accepted, zest of a game can further be enhanced by tactics in connection with execution of the special indication.

An exemplary embodiment provides a non-transitory storage medium encoded with a computer readable program for controlling a game device and executable by a computer of the game device. The game device is for playing a game in which a plurality of player characters move on a prescribed route in a game space displayed on a display. The program for controlling a game device includes instructions for accepting an indication for determining an amount of movement on the prescribed route directed to a player character among the plurality of player characters, instructions for determining an amount of movement on the prescribed route when the indication is accepted, instructions for updating positions of the player character for which the indication has been accepted and of all other player characters on the prescribed route in accordance with the determined amount of movement, and instructions for performing event processing at least on the player character for which the indication has been accepted in accordance with the position to which the player character has been moved. The instructions for accepting an indication include instructions for accepting a normal indication for determining a normal amount of movement and instructions for accepting a special indication for determining an amount of movement different from normal, which is executed alternative to the normal indication and of which number of permitted times of issuance by the plurality of player characters is limited.

According to the exemplary embodiment, since positions of the player character for which the indication has been accepted and of all other player characters are updated, movement of own player character directly affects movement of other player characters and hence zest of a game can be enhanced by tactics in connection with movement. In addition, at the time of movement, since a special indication of which number of permitted times of issuance by the plurality of player characters is limited is accepted, zest of a game can further be enhanced by tactics in connection with execution of the special indication.

An exemplary embodiment provides a game system. The game system is for playing a game in which a plurality of player characters move on a prescribed route in a game space displayed on a display. The game system includes a game device and a controller for operating the game device, the game device includes an indication acceptance unit for accepting from the controller, an indication for determining an amount of movement on the prescribed route directed to a player character among the plurality of player characters, a movement amount determination unit for determining an amount of movement on the prescribed route when the indication acceptance unit accepts the indication, a position updating unit for updating positions of the player character for which the indication has been accepted in the indication acceptance unit and of all other player characters on the prescribed route in accordance with the amount of movement determined by the movement amount determination unit, and an event processing unit for performing event processing at least on the player character for which the indication has been accepted in the indication acceptance unit in accordance with the position to which the player character has been moved, and the indication acceptance unit includes a normal indication acceptance unit for accepting a normal indication for determining a normal amount of movement and a special indication acceptance unit for accepting a special indication for determining an amount of movement different from normal, which is executed alternative to the normal indication and of which number of permitted times of issuance by the plurality of player characters is limited.

According to the exemplary embodiment, since positions of the player character for which the indication has been accepted and of all other player characters are updated, movement of own player character directly affects movement of other player characters and hence zest of a game can be enhanced by tactics in connection with movement. In addition, at the time of movement, since a special indication of which number of permitted times of issuance by the plurality of player characters is limited is accepted, zest of a game can further be enhanced by tactics in connection with execution of the special indication.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows an exemplary illustrative non-limiting diagram illustrating a special die selection screen according to the exemplary embodiment.

FIG. 12 shows an exemplary illustrative non-limiting diagram illustrating a specific example of the special die according to the exemplary embodiment.

DETAILED DESCRIPTION OF NON-LIMITING EXAMPLE EMBODIMENTS

Figure 1:
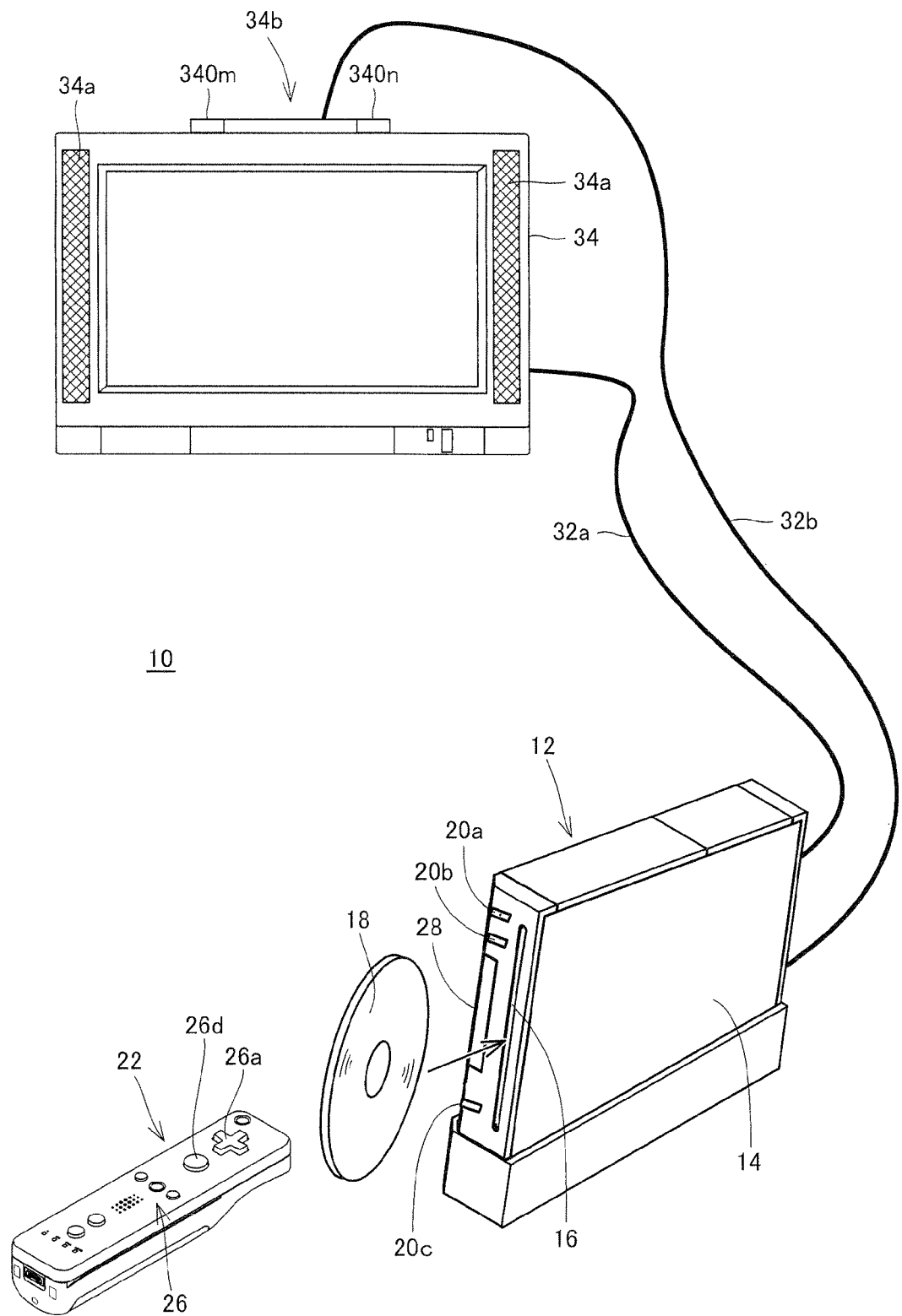
FIG. 1 shows an exemplary illustrative non-limiting configuration of a video game system 10 according to an exemplary embodiment.

An embodiment will be described in detail with reference to the drawings. The same or corresponding elements in the drawings have the same reference characters allotted and description thereof will not be repeated.

<Configuration of Game Device>

Referring to FIG. 1, a video game system 10 according to an embodiment includes a game device 12 representing one type of an image processing apparatus and a controller 22.

Game device 12 according to the present embodiment is designed to be able to communicate with at least one controller 22. In addition, game device 12 and each controller 22 are connected to each other through wireless communication. For example, wireless communication is implemented under Bluetooth® specifications, however, it may be implemented under other specifications such as infrared or wireless LAN. Alternatively, wire connection may be adopted.

Game device 12 includes a housing 14 in a substantially parallelepiped shape, and a disc slot 16 is provided in a front surface of housing 14. An optical disc 18 typically representative of a storage medium for storing a game program or the like is inserted in disc slot 16 and attached to a disc drive 54 (see FIG. 2) within housing 14. An LED and a light guide plate are arranged around disc slot 16, and the LED can illuminate in response to various processes.

In addition, in the front surface of housing 14 of game device 12, a power button 20a and a reset button 20b are provided in an upper portion thereof and an eject button 20c is provided in a lower portion thereof. Moreover, a connector cover 28 for an external memory card is provided between reset button 20b and eject button 20c, in the vicinity of disc slot 16.

An external memory card connector 62 (see FIG. 2) is provided inside connector cover 28 for external memory card, in which a not-shown external memory card (hereinafter simply also referred to as a "memory card") is inserted. The memory card is used for temporarily storing a game program or the like that is read from optical disc 18 and loaded, or it is used for storing (saving) game data of the game played with this video game system 10 (data of a game result or data while playing the game). The game data above, however, may be stored in an internal memory such as a flash memory 44 (see FIG. 2) provided inside game device 12, instead of the memory card. In addition, the memory card may be used as a back-up memory for the internal memory. Further, the game program or the like may be supplied (downloaded) to game device 12 from a server or the like connected to the network through a wire or wireless communication line. The game program or the like thus downloaded is stored in flash memory 44 (see FIG. 2) or a memory card provided in game device 12.

A general-purpose SD (Secured Digital) card may be employed as the memory card, however, other general-purpose memory cards such as a memory stick or a multimedia card (trademark) may also be employed.

An AV connector 58 (see FIG. 2) is provided on a rear surface of housing 14 of game device 12. An AV cable 32a is connected to AV connector 58, and game device 12, a monitor (display) 34 and a speaker 34a are connected to one another through this AV cable 32a. Monitor 34 and speaker 34a are typically implemented by a color television. AV cable 32a inputs a video signal from game device 12 to a video input terminal of the color television and inputs an audio signal to an audio input terminal. Therefore, for example, a game image of a three-dimensional (3D) video game is displayed on a screen of monitor 34 and stereophonic game sound such as game music or sound effect is output from left and right speakers 34a. In addition, a marker portion 34b having two infrared LEDs (markers) 340m and 340n is provided around monitor 34 (in the example shown in FIG. 1, on the top of monitor 34). Marker portion 34b is connected to game device 12 through a power cable 32b. Therefore, marker portion 34b is supplied with power from game device 12. Thus, markers 340m and 340n emit light and output infrared rays from the front of monitor 34.

Game device 12 is supplied with power by a general AC adapter (not shown). The AC adapter is inserted in an ordinary wall outlet at home and power supply for home (commercial power supply) is converted to a DC voltage signal suitable for driving game device 12. In other implementations, a battery may be employed as the power supply.

When the user plays some kind of a game (or another application, without limited to the game) with this video game system 10, the user initially turns on power of game device 12, selects appropriate optical disc 18 recording a program of a video game (or another application the user desires to play), and loads optical disc 18 to disc drive 54 of game device 12. Then, game device 12 starts execution of the video game or another application based on the program recorded on that optical disc 18. Alternatively, game device 12 may start execution of the video game or another application based on a program downloaded in advance from the server and stored in flash memory 44 (see FIG. 2) or the like.

The user operates controller 22 to provide an input to game device 12. For example, by operating any input means 26, the user starts the game or another application. Further, by moving controller 22 itself other than operating input means 26, the user can move a motion picture object (a player object) in a different direction or change a point of view of the user (a camera position) in a 3D game world.

In addition, controller 22 is provided with input means (a plurality of buttons or switches) 26. Specifically, a cross key 26a, an A button 26d, and the like are provided. Cross key 26a is a four-directional push switch, and includes operation portions pointing to four directions shown with arrows, that is, front (or up), rear (or down), right, and left. As the user operates any one of these operation portions, a direction of movement of a character (a player character) (simply also referred to as a character) or an object (a player object) operable by the user can be indicated or a direction of movement of a cursor can be indicated.

A button 26d is a push-button switch, and it is used for causing the player character or the player object to perform an operation other than indication of a direction, that is, any action including hitting (punching), throwing, catching (acquiring), riding, jumping, or the like. For example, in an action game, jumping, punching, actuating a weapon, or the like can be indicated. Alternatively, in a role-playing game (RPG) or simulation RPG, acquiring of an item, selection and determination of a weapon or a command, or the like can be indicated.

Moreover, controller 22 has an image pick-up information operating unit 80 (see FIG. 3), and a light incident port of image pick-up information operating unit 80 is provided at the tip end surface of controller 22, although not shown.

The shape of controller 22 and the shape, the number, the installation position, and the like of input means 26 are merely by way of example, and even variation as appropriate thereof is encompassed in the present embodiment.

Figure 2:
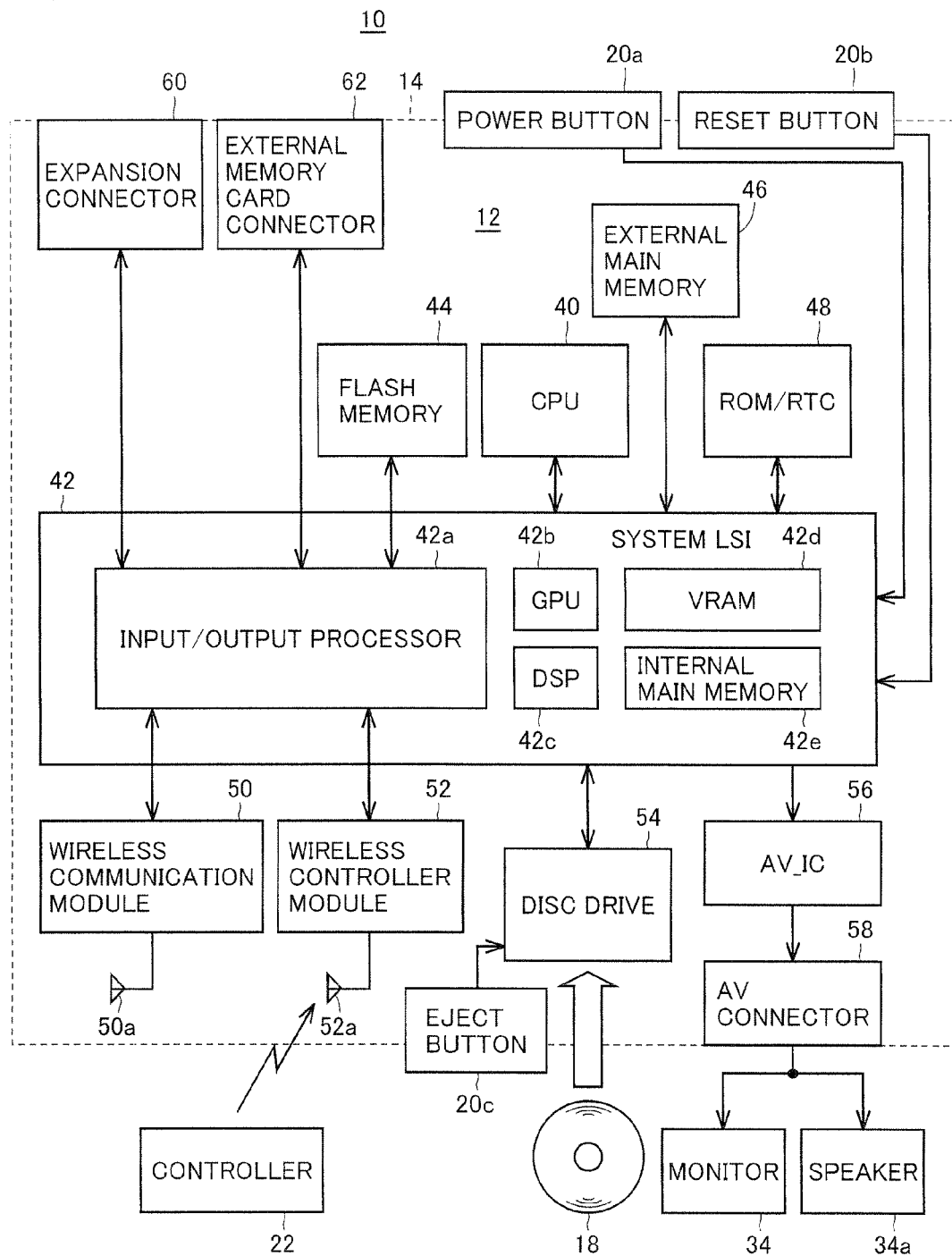
FIG. 2 shows an exemplary illustrative non-limiting block diagram showing an electrical configuration of video game system 10 shown in FIG. 1 according to the exemplary embodiment.

Referring to FIG. 2, each component within housing 14 is mounted on a printed circuit board. Game device 12 is provided with a CPU 40. This CPU 40 functions as a game processor. A system LSI 42 is connected to CPU 40. An external main memory 46, a ROM/RTC 48, disc drive 54, and an AV_IC 56 are connected to this system LSI 42.

External main memory 46 stores a program of various applications or various types of data, and it is used as a work area or a buffer area of CPU 40. ROM/RTC 48 is what is called a boot ROM, and a program for starting up game device 12 is incorporated therein and provided with a time counting circuit for counting time. Namely, CPU 40 obtains current time and day (year, month, day, and time) by referring to ROM/RTC 48. Disc drive 54 reads program data, object data, texture data or the like from optical disc 18, and writes such data in an internal main memory 42e or external main memory 46 which will be described later under the control of CPU 40.

System LSI 42 includes an input/output processor 42a, a GPU (Graphics Processor Unit) 42b, a DSP (Digital Signal Processor) 42c, a VRAM 42d, and internal main memory 42e, and these components are connected to one another through an internal bus.

Input/output processor (I/O processor) 42a transmits and receives data or downloads data. Transmission and reception and downloading of data will be described later in detail.

GPU 42b forms a part of rendering means. Receiving a graphics command (an image creation instruction) from CPU 40, GPU 42b generates game image data in accordance with the command. It is noted that CPU 40 provides an image generation program necessary for generating game image data to GPU 42b, in addition to the graphics command.

As described above, VRAM 42d is connected to GPU 42b. CPU 42b obtains data necessary for CPU 42b to execute the image creation command (image data: data such as polygon data or texture data) by accessing VRAM 42d. It is noted that CPU 40 writes image data necessary for rendering in VRAM 42d, by utilizing GPU 42b. GPU 42b accesses VRAM 42d and creates the game image data for rendering.

In the present embodiment, an example where GPU 42b generates game image data is described. On the other hand, when some kind of application other than the game application is executed, GPU 42b generates image data for that application.

In addition, DSP 42c functions as an audio processor and generates audio data corresponding to sound, voice or music to be output from speaker 34a, by using sound data or sound waveform (tone) data stored in internal main memory 42e or external main memory 46.

The game image data and the audio data generated as described above are read by AV_IC 56 and output to monitor 34 and speaker 34a through AV connector 58. Therefore, a game picture is displayed on monitor 34 and sound (music) necessary for the game is output from speaker 34a.

In addition, flash memory 44, a wireless communication module 50 and a wireless controller module 52 as well as an expansion connector 60 and external memory card connector 62 are connected to input/output processor 42a. Moreover, an antenna 50a is connected to wireless communication module 50 and an antenna 52a is connected to wireless controller module 52.

Input/output processor 42a can communicate with another game device or various servers connected to the network through wireless communication module 50. Input/output processor 42a, however, can also communicate directly with another game device without communicating via the network.

In addition, input/output processor 42a receives input data transmitted from controller 22 through antenna 52a and wireless controller module 52, and causes internal main memory 42e or external main memory 46 to store (temporarily store) the input data in a buffer area thereof. After the input data is used in game processing by CPU 40, it is erased from the buffer area.

In the present embodiment, as described above, wireless controller module 52 communicates with controller 22 under Bluetooth® specifications.

In addition, expansion connector 60 and external memory card connector 62 are connected to input/output processor 42a. Expansion connector 60 is a connector for an interface such as a USB or an SCSI, and a medium such as an external storage medium or a peripheral device such as another controller can be connected. In addition, a wired LAN adapter may be connected to expansion connector 60 and wired LAN can be utilized instead of wireless communication module 50.

An external storage medium such as a memory card can be connected to external memory card connector 62. Therefore, for example, input/output processor 42a can access the external storage medium to store data therein or to read data therefrom, through expansion connector 60 or external memory card connector 62.

As shown also in FIG. 1, game device 12 (housing 14) is provided with power button 20a, reset button 20b and eject button 20c. Power button 20a is connected to system LSI 42. When power button 20a is turned on, system LSI 42 supplies power to each component in game device 12 through a not-shown AC adapter and sets a mode in a normally powered state (referred to as a normal mode). On the other hand, when power button 20a is turned off, system LSI 42 supplies power only to some components in game device 12 and sets a mode in which power consumption is minimized (hereinafter also referred to as a "stand-by mode"). In the present embodiment, when the stand-by mode is set, system LSI 42 indicates stop of power supply to components other than input/output processor 42a, flash memory 44, external main memory 46, ROM/RTC 48, wireless communication module 50, and wireless controller module 52. Therefore, the stand-by mode refers to a mode in which CPU 40 does not execute an application.

Though power is supplied to system LSI 42 even in the stand-by mode, power consumption is lowered by avoiding drive of GPU 42b, DSP 42c and VRAM 42d as a result of stop of supply of a clock thereto.

In addition, a fan for expelling heat of an IC such as CPU 40 or system LSI 42 is provided in housing 14 of game device 12. In the stand-by mode, this fan is also stopped. If the user does not wish to use the stand-by mode, setting for not using the stand-by mode may be made so that power supply to all circuit components is completely stopped as power button 20a is turned off.

Reset button 20b is also connected to system LSI 42. When reset button 20b is pressed, system LSI 42 re-starts a start-up program of game device 12. Eject button 20c is connected to disc drive 54. When eject button 20c is pressed, optical disc 18 is ejected from disc drive 54.

Figure 3:
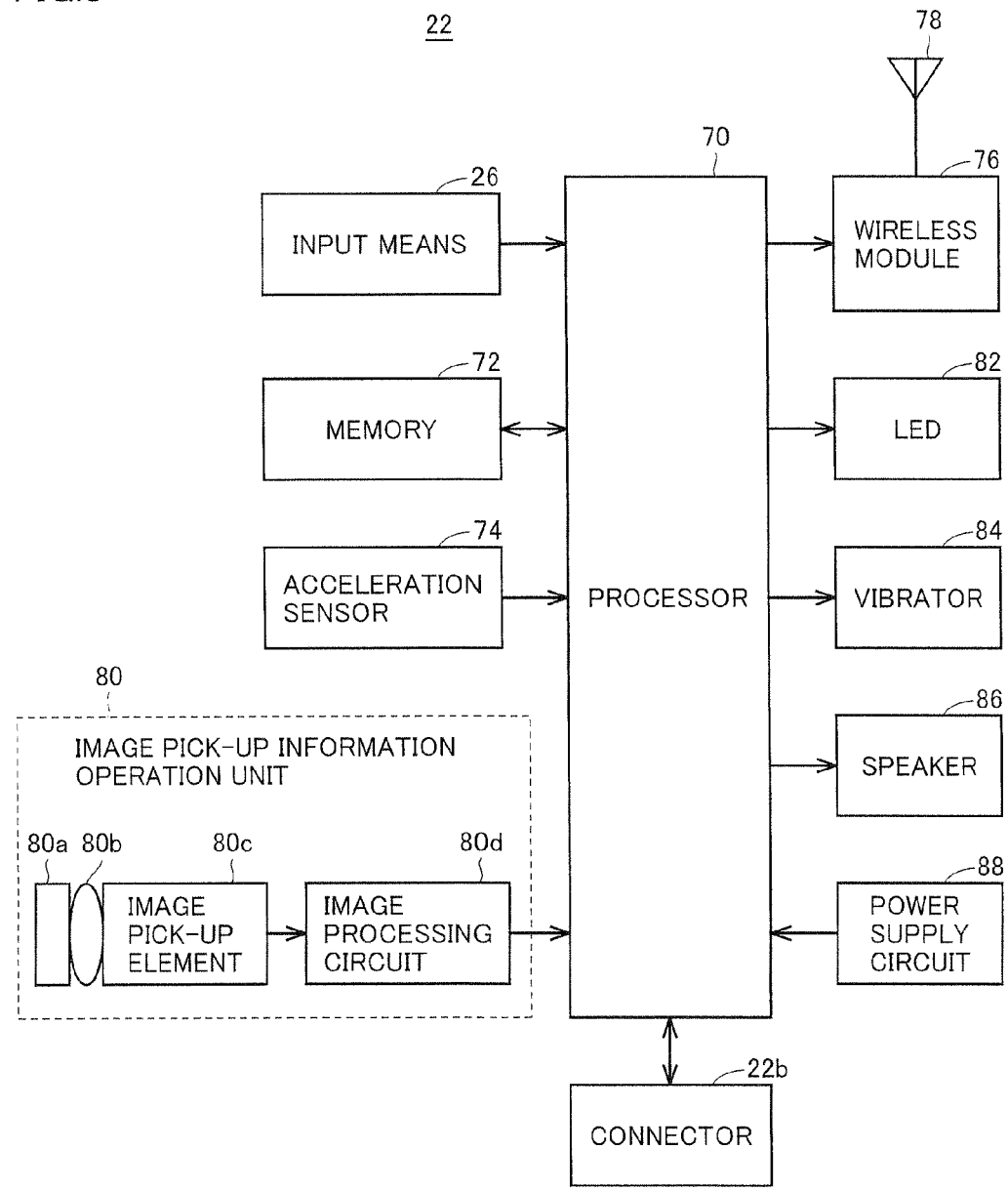
FIG. 3 shows an exemplary illustrative non-limiting block diagram showing an electrical configuration of a controller 22 according to the exemplary embodiment.

Referring to FIG. 3, controller 22 includes a processor 70, to which an external expansion connector 22b, input means 26, a memory 72, an acceleration sensor 74, a wireless module 76, image pick-up information operating unit 80, an LED 82 (an indicator 22c), a vibrator 84, a speaker 86, and a power supply circuit 88 are connected through an internal bus (not shown). In addition, an antenna 78 is connected to wireless module 76.

Processor 70 is responsible for overall control of controller 22, and it transmits (inputs) as input data, information input from input means 26, acceleration sensor 74 and image pick-up information operating unit 80 (input information) to game device 12 through wireless module 76 and antenna 78. Here, processor 70 uses memory 72 as a work area or a buffer area.

An operation signal (operation data) from input means 26 (26a, 26d, and the like) described above is input to processor 70, which once causes memory 72 to store the operation data.

In addition, acceleration sensor 74 detects each acceleration in three axes of a vertical direction (direction of y-axis), a horizontal direction (direction of x-axis) and a front-rear direction (direction of z-axis) of controller 22. Acceleration sensor 74 is typically a capacitance-type acceleration sensor, however, a sensor of another type may be employed.

For example, acceleration sensor 74 detects acceleration for each of the x-axis, the y-axis and the z-axis (ax, ay, az) every first prescribed time, and inputs the detected acceleration data (acceleration data) to processor 70. For example, acceleration sensor 74 detects acceleration in the direction of each axis in a range from −2.0 G to 2.0 G (G represents acceleration of gravity; to be understood similarly hereinafter). Processor 70 detects acceleration data provided from acceleration sensor 74 every second prescribed time, and causes memory 72 to once store the acceleration data. Processor 70 creates input data including at least one of operation data, acceleration data and marker coordinate data which will be described later, and transmits the created input data to game device 12 every third prescribed time (for example, 5 msec.).

Here, a person skilled in the art could readily understand from the description in the present specification that further information on controller 22 can be estimated or calculated (determined) as a result of processing by the processor of game device 12 (such as CPU 40), the processor of controller 22 (such as processor 70) or the like, based on the acceleration data output from acceleration sensor 74.

For example, in an example where a computer side performs processing on the premise that the controller including a one-axis acceleration sensor is in a static state, that is, where it is assumed that acceleration detected by the acceleration sensor consists of only acceleration of gravity, if controller 22 is actually in a static state, whether an attitude of controller 22 is inclined with respect to the direction of gravity or how it is inclined can be determined based on the detected acceleration data. Specifically, if a state that an axis detected by the acceleration sensor is in the vertically downward direction is defined as the reference, inclination can be determined only based on whether 1 G (acceleration of gravity) is applied or not, and magnitude of inclination can be determined based on magnitude of acceleration of gravity.

Alternatively, in a case of a multi-axis acceleration sensor, acceleration data in each axis is further processed so that a degree of inclination with respect to the direction of gravity can be known in further detail. In such a case, processor 70 may perform processing for calculating data of an angle of inclination of controller 22 based on outputs from the acceleration sensor, however, processing may be such that approximate inclination can be estimated based on outputs from the acceleration sensor without processing for calculating inclination angle data. Thus, by combining the acceleration sensor with the processor, an inclination, an attitude or a position of controller 22 can be determined.

On the other hand, in an example where the acceleration sensor is premised on a dynamic state, acceleration in accordance with movement of the acceleration sensor is detected in addition to a component of acceleration of gravity. Therefore, by eliminating the component of acceleration of gravity with prescribed processing, a direction of movement or the like can be determined. Specifically, when controller 22 having the acceleration sensor is moved in a manner dynamically accelerated by a user's hand, the acceleration data generated by the acceleration sensor is processed so that various movements and/or positions of controller 22 can be calculated.

Even in an example where the acceleration sensor is premised on a dynamic state, inclination with respect to the direction of gravity can be determined by eliminating acceleration in accordance with movement of the acceleration sensor with prescribed processing. In another embodiment, the acceleration sensor may incorporate an embedded signal processing device or a dedicated processing device of another type for subjecting an acceleration signal (acceleration data) output from contained acceleration detection means to desired processing prior to output of acceleration data to processor 70. For example, an embedded or dedicated processing device may convert sensed acceleration data into a corresponding inclination angle (or other preferred parameters) if the acceleration sensor serves to detect static acceleration (for example, acceleration of gravity).

Wireless module 76 modulates a carrier wave at a prescribed frequency with input data and emits the resultant weak radio signal from antenna 78, using, for example, the Bluetooth® technique. Namely, input data is modulated by wireless module 76 into a weak radio signal and transmitted from antenna 78 (controller 22). This weak radio signal is received by wireless controller module 52 provided in game device 12 described above. The received weak radio wave is subjected to demodulation and decoding processing, and consequently, game device 12 (CPU 40) can obtain input data from controller 22. Then, CPU 40 proceeds with game processing in accordance with the obtained input data and the program (game program).

In addition, as described above, controller 22 is provided with image pick-up information operating unit 80. Image pick-up information operating unit 80 is constituted of an infrared filter 80a, a lens 80b, an image pick-up element 80c, and an image processing circuit 80d. Infrared filter 80a allows passage of only infrared of light incident from the front of controller 22. As described above, markers 340m and 340n arranged in the vicinity of (around) a display screen of monitor 34 are infrared LEDs for outputting infrared rays from the front of monitor 34. Therefore, an image of markers 340m and 340n can more accurately be picked up by providing infrared filter 80a. Lens 80b collects the infrared rays that have passed through infrared filter 80a and directs the infrared rays toward image pick-up element 80c. Image pick-up element 80c is implemented by a solid-state image pick-up element such as a CMOS sensor or a CCD, and it picks up an image of the infrared rays collected by lens 80b. Therefore, image pick-up element 80c picks up an image only of the infrared rays that have passed through infrared filter 80a to generate image data. An image picked up by image pick-up element 80c is hereinafter referred to as a picked-up image. The image data generated by image pick-up element 80c is processed by image processing circuit 80d. Image processing circuit 80d calculates a position of an image pick-up object (markers 340m and 340n) within the picked-up image and outputs each coordinate value indicating the position to processor 70 as the image pick-up data every fourth prescribed time. Using the image data of the picked-up image including the image pick-up object, image processing circuit 80d calculates a coordinate indicating a position of each marker 340m, 340n in the picked-up image (a marker coordinate). As the distance between target images in the picked-up image is varied depending on a distance between controller 22 and markers 340m, 340n, game device 12 can obtain the distance between controller 22 and markers 340m, 340n by calculating the distance between the two marker coordinates.

Figure 4:
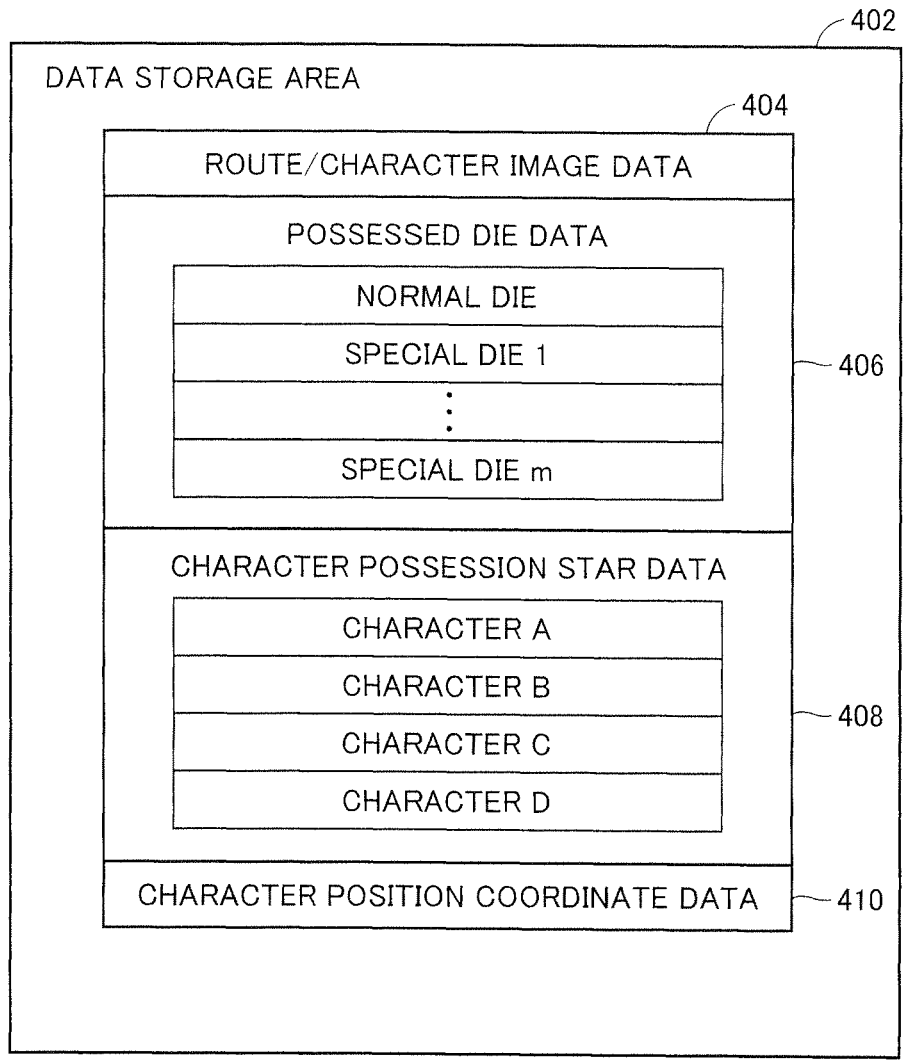
FIG. 4 shows an exemplary illustrative non-limiting diagram illustrating a data storage area 402 in an external main memory 46 of a game device 12 according to the exemplary embodiment.

Referring to FIG. 4, a data storage area 402 includes a route/character image data area 404, a possessed die data area 406, a character possession star data area 408, and a character position coordinate data area 410.

Route/character image data area 404 is an area storing image data necessary for rendering a route as well as an object, a character and the like on the route in the game space.

In the present example, possessed die data area 406 is an area storing data on dice possessed by a plurality of characters among a plurality of types of dice that can be possessed and used. In the present example, a normal die shows any of 1 to 6. A cast shown by a special die is determined differently from a normal die. Here, by way of example, a case where data corresponding to each of special dice (1 to m) is stored is shown. Specifically, data on the number of times of use of a die is stored. A normal die can be used in an unlimited manner. On the other hand, a special die is restricted in terms of the number of times of use.

Character possession star data area 408 is an area storing data on the number of stars possessed by each character, although description will be given later. In the present example, by way of example, a case where an area storing the number of stars possessed by each of four characters A to D is provided is shown.

Character position coordinate data area 410 stores data on a character position on the route in the game space.

Figure 5:
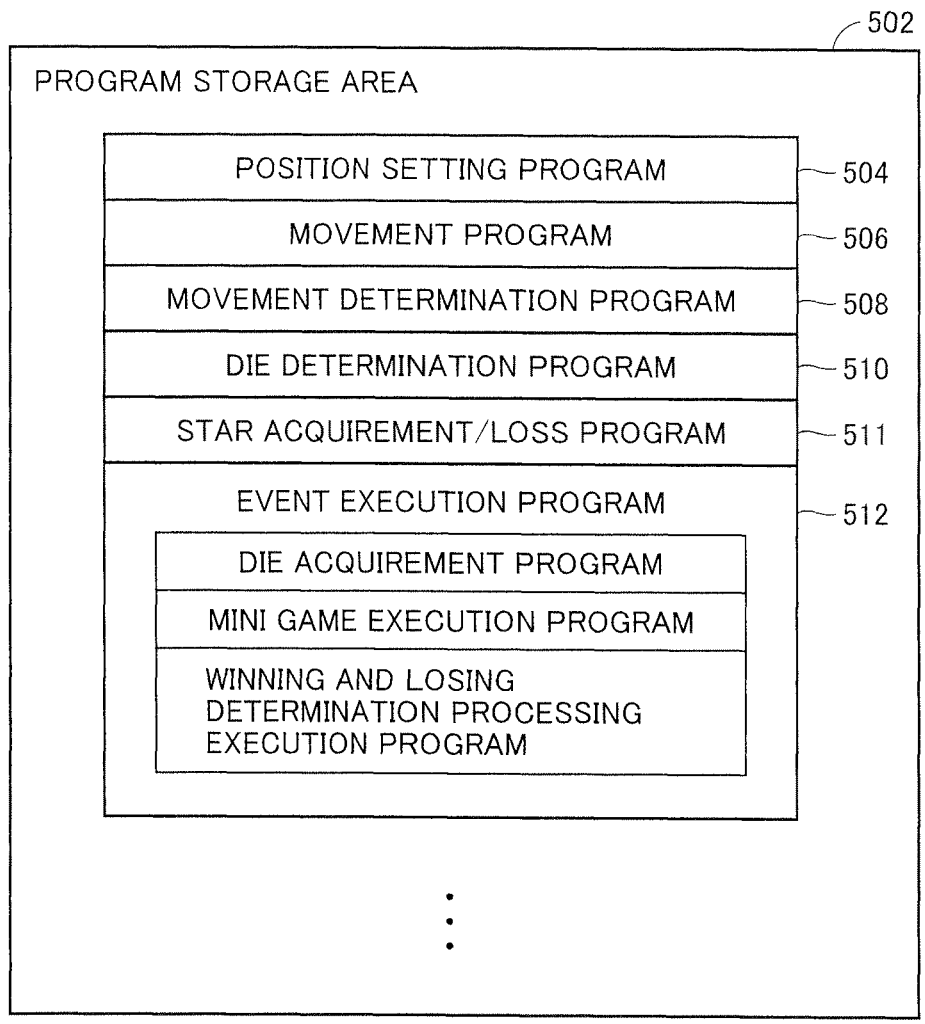
FIG. 5 shows an exemplary illustrative non-limiting diagram illustrating a program storage area 502 in external main memory 46 of game device 12 according to the exemplary embodiment.

Referring to FIG. 5, a program storage area 502 includes a position setting program 504, a movement program 506, a movement determination program 508, a die determination program 510, a star acquirement/loss program 511, and an event execution program 512.

Position setting program 504 is a program for setting a display position of an object such as a character and a star on the route in the game space.

Movement program 506 is a program for moving a character in the game space.

Movement determination program 508 is a program for determining whether a character has moved to a prescribed position or not.

Die determination program 510 is a program for determining an amount of movement based on a die. In the present example, by way of example, a cell is exemplified.

Star acquirement/loss program 511 is a program for processing acquirement or loss of a star.

Event execution program 512 is a program for executing various events. For example, by way of example, event execution program 512 includes a die acquirement program for acquiring a special die as an event, a mini game execution program for executing a mini game, and a winning and losing determination execution program for performing winning and losing determination processing.

By executing data and a program in FIGS. 4 and 5, a game in accordance with the embodiment can be played.

Outlines of a game according to the embodiment will initially be described.

Figure 6:
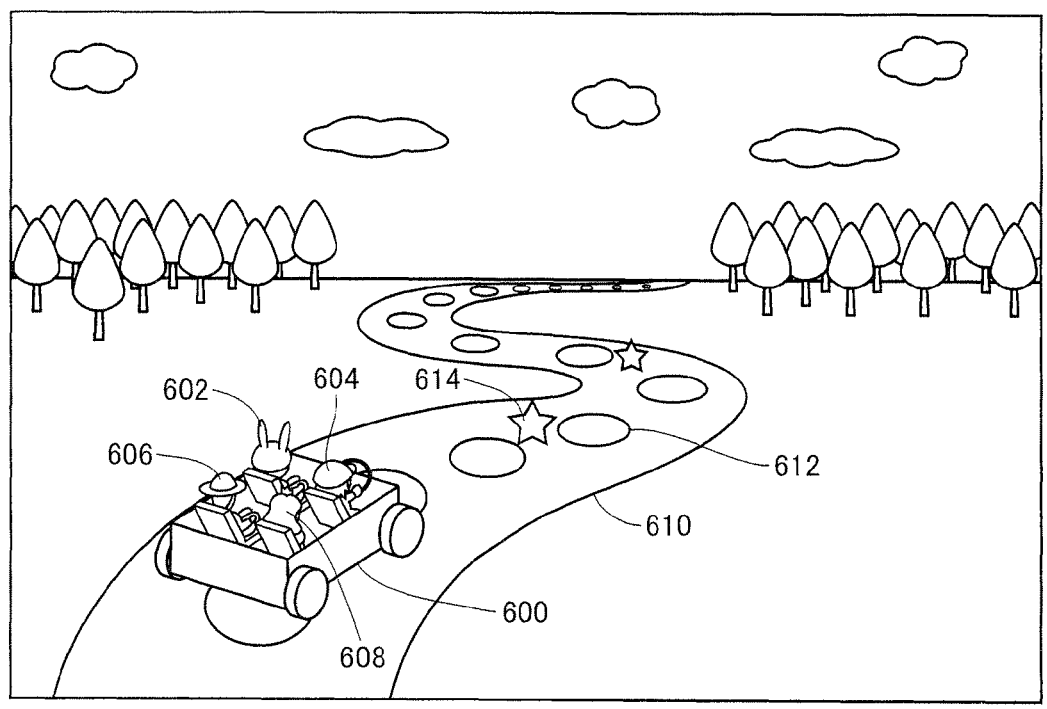
FIG. 6 shows an exemplary illustrative non-limiting diagram illustrating one example of a game picture according to the exemplary embodiment.

Referring to FIG. 6, here, a case where a plurality of (in the present example, four) characters 602 to 608 are shown and the four characters ride in one vehicle 600 and move together on the route is displayed. In the present example, a case where a movement route 610 is displayed and a plurality of cells 612 are arranged on movement route 610 is shown. In addition, a case where a star 614 is arranged between the cells through which movement is made is displayed.

In the present game, the plurality of characters do not move independently of one another but they all move together along the route (for example, in a party in one vehicle).

Figure 7:
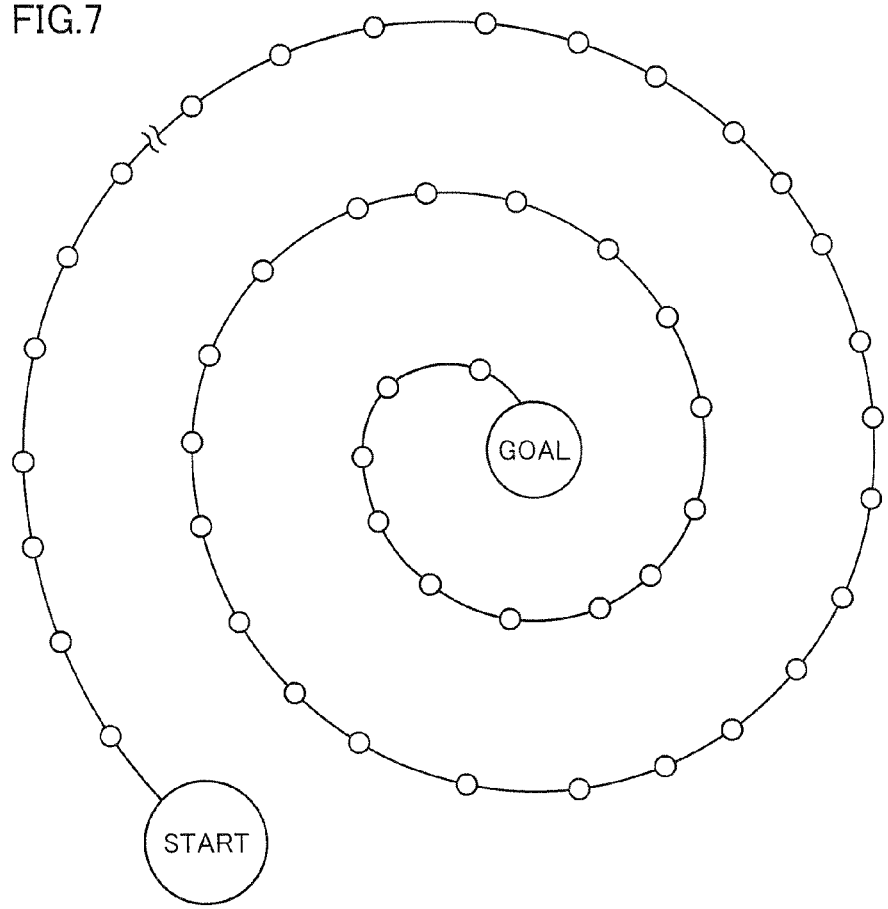
FIG. 7 shows an exemplary illustrative non-limiting diagram illustrating a route of a game according to the exemplary embodiment.

Referring to FIG. 7, here, a case where a route is provided on a spiral is shown.

On the route, a plurality of cells are provided, and the plurality of characters move in one party for each cell provided until they arrive at the goal, which is a final position, from a start position, which is an initial position.

A plurality of types of cells brought in correspondence with various events are provided. For example, a normal cell, an event cell and the like are provided. When movement to a normal cell is made, processing for acquiring any special die is performed. Alternatively, when movement to an event cell is made, a mini game is executed. Though a case where a mini game is executed when movement to an event cell is made will be described in the present example, an event is not particularly limited to a mini game and other events can also occur. For example, various events such as change in order of a plurality of characters operated or movement to another location are applicable.

A star or the like is arranged between cells as necessary, and the plurality of characters move to the goal while acquiring or losing a star. Then, winning and losing is determined based on the number of stars possessed by each character at the goal.

It is noted that the route is by way of example, and the route may be branched or various routes are applicable.

It is noted that, in the present example, since movement cell by cell is made, an amount of movement can readily be grasped. Namely, a cell is easily identified at the time of using tactics in connection with movement and zest of a game is enhanced.

Referring to FIG. 8(A), here, processing for acquiring a star will be described. For example, as movement through 6 cells is made, three stars 614 are passed. Therefore, it is assumed that three stars are acquired.

Referring to FIG. 8(B), here, processing for losing a star will be described. For example, as movement through 6 cells is made, three bad lucks 615 are passed. Therefore, it is assumed that three stars are lost.

It is noted here that it is any one character among the plurality of characters on vehicle 600 that acquires or loses a star. For example, in a case where character A acquires three stars or loses three stars, the number of possessed stars stored in an area of the character possession star data of character A is updated.

It is noted that arrangement of stars or bad lucks is not limited to the fashion above, and for example, a plurality of stars or bad lucks may be arranged at the same position, a star and a bad luck may be arranged at the same position, and various arrangements are applicable.

Figure 8:
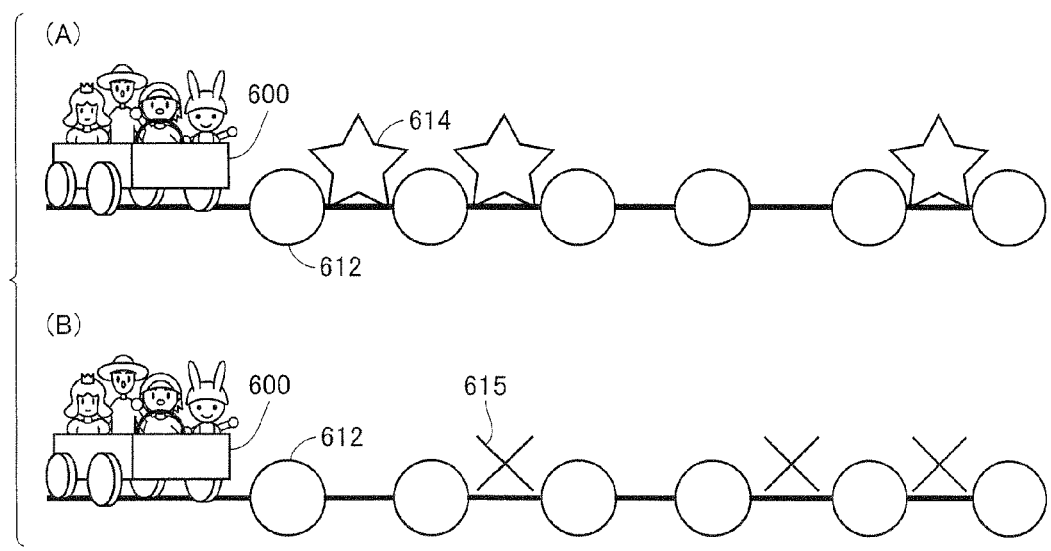
FIG. 8 shows an exemplary illustrative non-limiting diagram illustrating processing for acquiring and losing a star in the game according to the exemplary embodiment.
Figure 9:
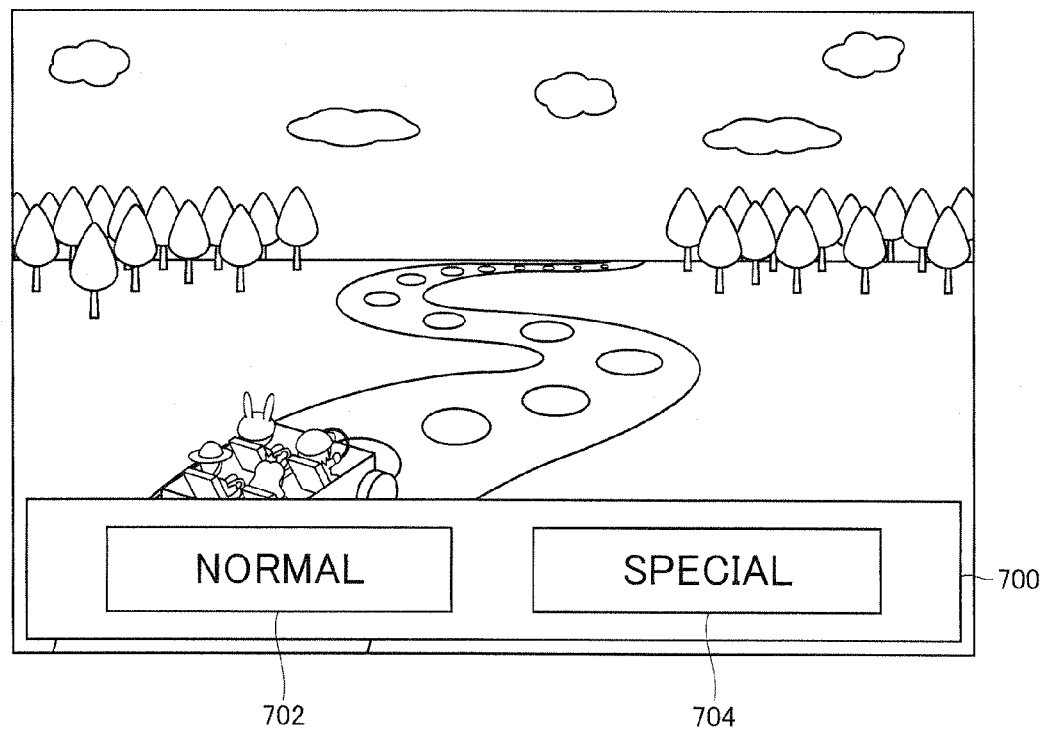
FIG. 9 shows an exemplary illustrative non-limiting diagram illustrating a die selection screen when movement processing in the game is performed according to the exemplary embodiment.

Referring to FIG. 9, for example, when a prescribed button (for example, A button 26d) of controller 22 is selected in the screen in FIG. 8, a die selection screen 700 is displayed.

Here, a case where a "normal" button 702 for selecting a normal die and a "special" button 704 for selecting a special die are provided is shown. It is assumed that cross key 22a of controller 22 is operated to allow selection of any button. Then, it is assumed, for example, that A button 22d of controller 22 is operated to select a button.

For example, when a normal die is selected, movement processing based on a cast of the normal die is performed as movement processing.

Specifically, values of 1 to 6 are allocated to the normal die, and by selecting the normal die, the normal die is cast and movement in accordance with a cast shown is made.

Figure 10:
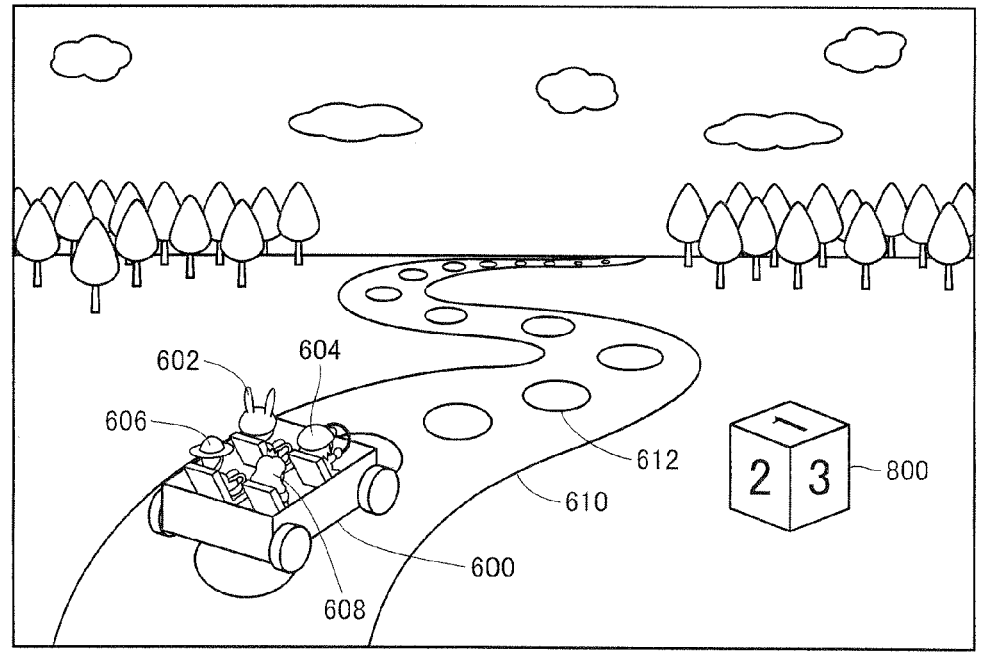
FIG. 10 shows an exemplary illustrative non-limiting diagram illustrating one screen of movement processing according to the exemplary embodiment.

Referring to FIG. 10, for example, a case where a normal die is selected and a normal die 800 shows "1" is shown.

Therefore, in this case, vehicle 600 carrying the plurality of characters 602 to 608 moves by one cell from the current cell position.

Referring to FIG. 11, for example, when "special" button 704 is selected in die selection screen 700 in FIG. 9, a special die selection screen 900 is displayed. Special die selection screen 900 is displayed in accordance with the possessed die data. The possessed die data is data on dice shared by all of the plurality of characters 602 to 608.

Special die selection screen 900 shows special dice. Here, a "zero" die 902, a "123" die 904, a "456" die 906, and a "slow" die 908 are shown. In addition, the number of permitted times of use is shown under each die displayed. Specifically, the number of permitted times of use of "zero" die 902 is shown as 1 (×1), the number of permitted times of use of "123" die 904 is shown as 0 (×0), the number of permitted times of use of "456" die 906 is shown as 1 (×1), and the number of permitted times of use of "slow" die 908 is shown as 0 (×0). Though not displayed, other special dice can also be displayed similarly by operating cross key 22a of controller 22. Then, it is assumed that operation of cross key 22a of controller 22 allows selection of any die. Then, for example, it is assumed that, by operating A button 22d of controller 22, a special die is selected. It is noted that a special die of which number of permitted times of use is 0 cannot be selected.

For example, when "zero" die 902 is used, the number of permitted times of use is 0 (×0). When "zero" die 902 is used, such tactics that the operated character does not move but a character next in the order is moved is used and zest of a game can be enhanced.

It is noted that a normal die or a special die does not necessarily have to be selected first as shown in FIG. 9, and a die may be selected from among dice including both of the normal die and the special dice in the die selection screen as in FIG. 11. By doing so, the number of steps until a die is selected (cast) can be decreased.

Referring to FIG. 12, FIG. 12(A) shows the "zero" die showing a value of "0" as it is cast, FIG. 12(B) shows the "123" die showing any value of "1, 2, 3" as it is cast, FIG. 12(C) shows the "456" die showing any value of "4, 5, 6" as it is cast, FIG. 12(D) shows the "slow" die facilitating selection of a desired cast in response to an indication given at prescribed timing as a value of a cast is slowly displayed, and FIG. 12(E) shows a "10-face" die showing any value from "1 to 10" as it is cast.

Figure 13:
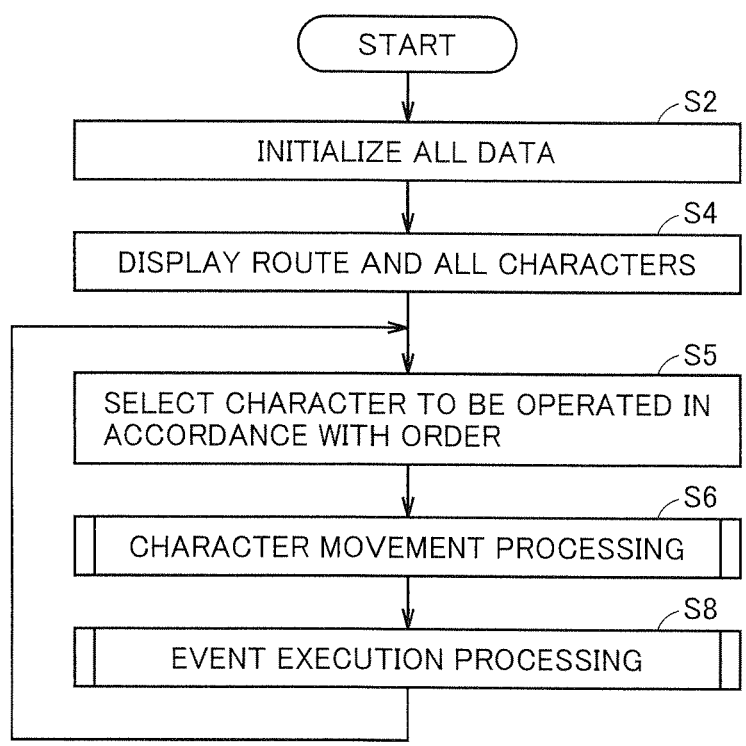
FIG. 13 shows an exemplary illustrative non-limiting flowchart illustrating a series of processes for playing the game according to the exemplary embodiment.

Referring to FIG. 13, when a start-up operation is performed through controller 22, CPU 40 initializes all data stored in data storage area 402 in external main memory 46. As a result of this processing, for example, possessed die data area 406 in data storage area 402 in FIG. 4 is initialized. When possessed die data area 406 is initialized, in the present example, the normal die can be used in an unlimited manner and any one of special dice is set to the number of permitted times of use of 1, with the number of permitted times of use of other special dice being set to 0. In addition, character possession star data area 408 and character position coordinate data 410 are also initialized. Namely, possessed star data indicates 0. Further, the character position is set to the start position representing an initial state.

Then, CPU 40 causes monitor 34 to display a movement route, an object such as a star, m (in the present example, 4) characters, and the like based on the route/character image data and the character coordinate data in data storage area 402, in accordance with position setting program 504 and through GPU 42b.

Then, CPU 40 selects a character to be operated, in the order designated in accordance with movement program 506 (step S5). For example, it is assumed that the order of selection is allotted to each of the plurality of characters 602 to 608. Then, selection starting from the character in the first place is made.

Then, CPU 40 performs character movement processing in accordance with a selected character to be operated, in accordance with movement program 506 (step S6). The character movement processing will be described later.

Then, CPU 40 performs event processing in a cell to which movement has been made through the character movement processing, in accordance with event execution program 512 (step S8).

The process again returns to step S5, and a character to be operated next is selected and similar processing is repeated.

Figure 14:
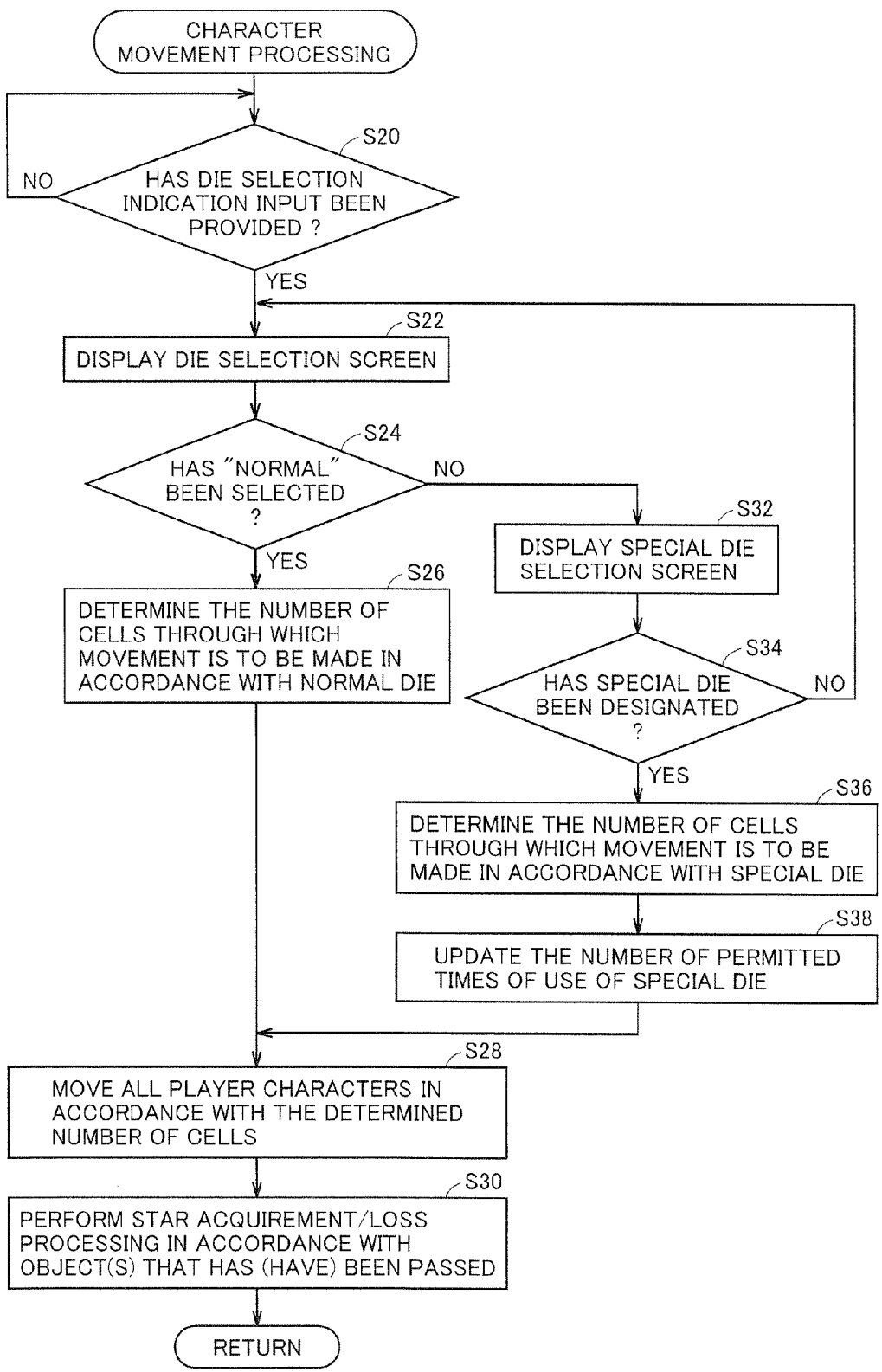
FIG. 14 shows an exemplary illustrative non-limiting flowchart illustrating character movement processing according to the exemplary embodiment.

Referring to FIG. 14, initially, CPU 40 determines whether a die selection indication input has been provided or not (step S20).

For example, in the present example, in the game picture in FIG. 6, whether a prescribed input of controller 22 (for example, A button 26d) has been provided or not is determined.

When CPU 40 determines in step S20 that a die selection indication input has been provided (YES in step S20), it causes die selection screen 700 (FIG. 9) to be displayed (step S22).

Then, CPU 40 determines whether "normal" button 702 has been selected in die selection screen 700 or not (step S24).

When CPU 40 determines that "normal" button 702 has been selected (YES in step S24), it determines the number of cells through which movement should be made in accordance with the normal die (step S26). CPU 40 determines the number of cells in accordance with the die determination program in accordance with the selected die. In the case of the normal die, for example, the number of cells from 1 to 6 is determined by using random numbers.

Then, CPU 40 moves all player characters in accordance with the determined number of cells (step S28).

Then, CPU 40 performs star acquirement or loss processing (FIG. 8) in accordance with object(s) that has (have) been passed, based on star acquirement/loss program 511 (step S30). It is noted here that star acquirement or loss processing is performed on a selected character to be operated. For example, when character A acquired three stars, the number of possessed stars stored in the area of the character possession star data of character A is updated. The number of stars of other characters is also updated in a similar fashion.

Then, the process ends (return).

Therefore, in the present example, as described above, all characters move together as the selected character to be operated moves. Therefore, such movement directly affects other characters. In the conventional case, since each character has independently been moved, such movement has not directly affected other characters. Therefore, tactics in connection with movement has been less likely in the conventional case. In the case of the present example, however, tactics in connection with movement is used and zest of a game is enhanced.

For example, when a selected character to be operated is moved to come closer to bad luck, a character selected next in the order is more likely to lose a star due to bad luck and tactics against other characters in connection with movement is used.

In addition, since all characters move to the same position, a status on the route is readily grasped and zest of a game is enhanced.

Moreover, since movement of a character to be operated in its own order can be taken into consideration while movement of other selected characters to be operated is observed, speed of thinking increases and a speed of game progress also increases. Thus, zest of a game is enhanced.

On the other hand, when "normal" button 702 has not been selected in step S24 (NO in step S24), that is, when "special" button 704 has been selected, CPU 40 causes display of special die selection screen 900 (FIG. 11) (step S32).

Then, CPU 40 determines whether a special die has been designated or not (step S34). Specifically, which special die has been designated in special die selection screen 900 by operating controller 22 is determined.

When CPU 40 determines that a special die has been designated (YES in step S34), it determines the number of cells through which movement is to be made in accordance with the special die (step S36). CPU 40 determines the number of cells in accordance with the die determination program in accordance with the selected special die. For example, when the "zero" die has been designated, the number of cells of 0 is determined.

Then, CPU 40 updates the number of permitted times of use of the special die (step S38). Namely, since the special die has been used, the corresponding number of permitted times of use of the special die in possessed die data area 406 is decremented.

Then, the process proceeds to step S28 and CPU 40 moves all player characters in accordance with the determined number of cells (step S28). Subsequent processing is the same as described above.

As described above, the special dice in the present example are shared by the plurality of characters, and when a special die is used, the number of permitted times of use of the special die that was used is decremented (updated).

Therefore, a special die is not possessed independently by each character but it is shared, Therefore, in selecting a special die, tactics is used. Namely, use of an advantageous special die of which number of times of use is restricted results in restriction of the number of permitted times of use thereof by other characters, and tactics is used. Thus, zest of a game is enhanced. Then, not only the special dice can simply be used but also use thereof affects movement of the plurality of characters as a whole. Thus, a degree of tactics is further increased and zest of a game can be enhanced.

Figure 15:
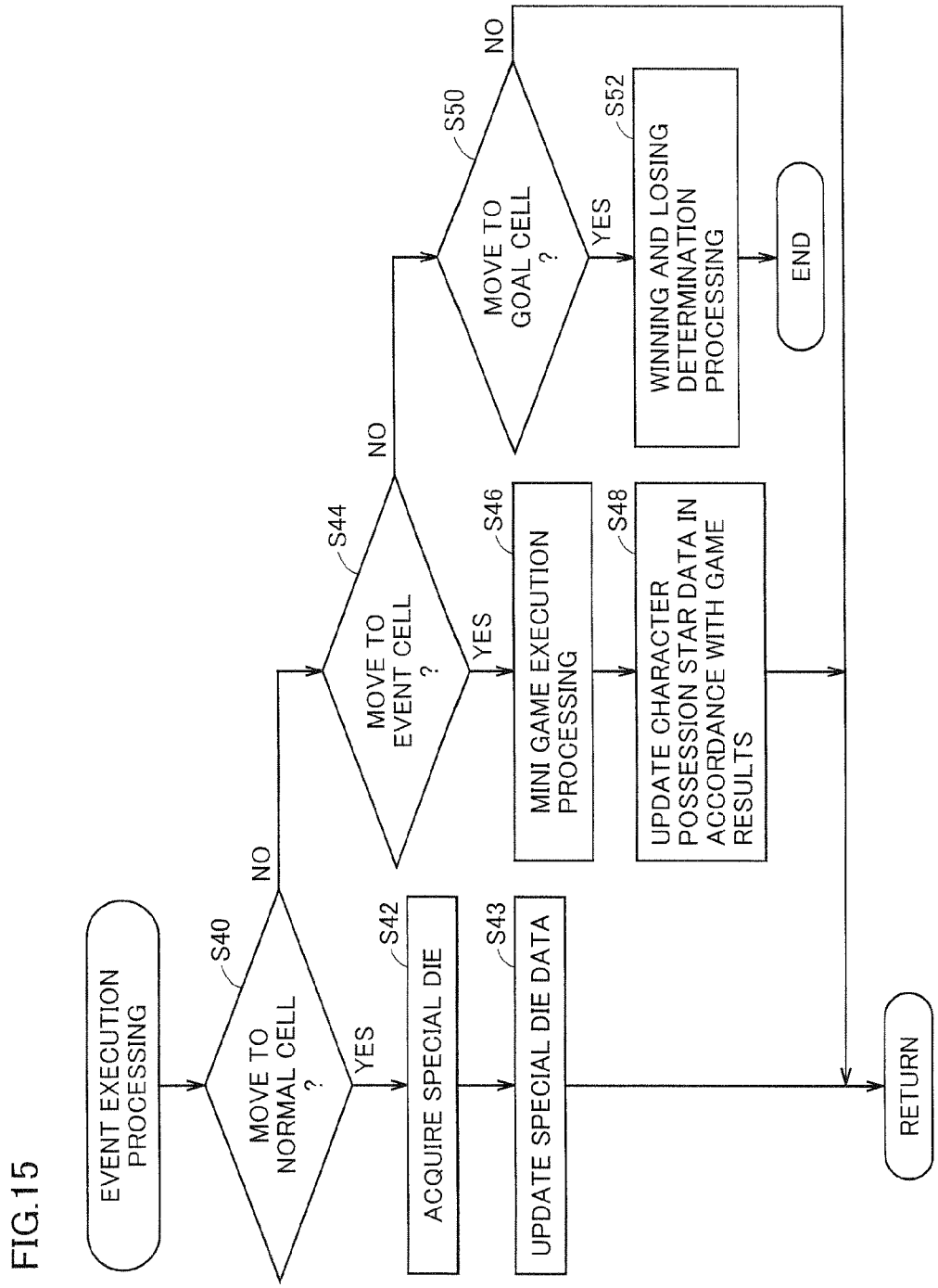
FIG. 15 shows an exemplary illustrative non-limiting flowchart for performing event processing according to the exemplary embodiment.

Referring to FIG. 15, CPU 40 determines to which cell movement has been made in accordance with the movement determination program. Then, various types of event processing are performed in accordance with the event execution program corresponding to the cell to which movement has been made.

CPU 40 determines whether movement to a normal cell has been made or not (step S40).

When CPU 40 determines in step S40 that movement to a normal cell has been made (YES in step S40), it performs special die acquirement processing in accordance with the die acquirement program (step S42). Specifically, one of the special dice shown in FIG. 12 is randomly acquired.

Then, CPU 40 updates the special die data (step S43). Namely, the number of times of use in the possessed die data is updated. Namely, the number of times increases by one.

Then, the process ends (return). Namely, the process returns to step S5 in FIG. 13, a character to be operated next is selected, and similar character movement processing (step S6) and event execution processing (step S8) are performed. As a result of such processing, a character is selected sequentially and the game proceeds.

Then, when CPU 40 determines in step S40 that movement to a normal cell has not been made (NO in step S40), it determines whether movement to an event cell has been made or not (step S44).

When CPU 40 determines in step S44 that movement to an event cell has been made (YES in step S44), it performs mini game processing in accordance with the mini game execution program (step S46).

Then, CPU 40 updates the character possession star data in accordance with game results (step S48). Specifically, a star is added or subtracted in accordance with the results. It is noted that the mini game may be a mini game in which only selected characters to be operated participate or a mini game in which a plurality of characters together participate, and various forms are applicable.

Then, the process ends (return). Namely, the process returns to step S5 in FIG. 13.

When CPU 40 determines in step S44 that movement to an event cell has not been made (NO in step S44), it determines whether movement to a goal cell has been made or not (step S50).

When CPU 40 determines in step S50 that movement to the goal cell has been made (YES in step S50), it performs winning and losing determination processing in accordance with the winning and losing determination execution program (step S52). The winning and losing determination processing is performed based on the possessed star data.

Then, the game ends (end).

On the other hand, when it is determined in step S50 that movement to the goal cell has not been made (NO in step S50), the process ends (return).

Figures 16, 17:
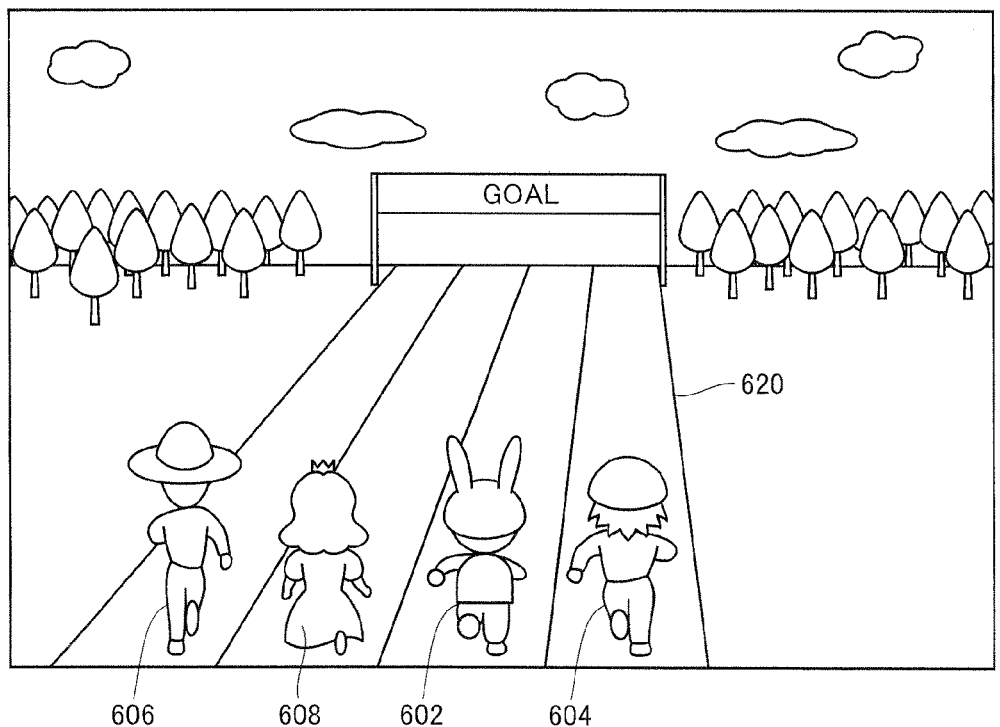
FIG. 16 shows an exemplary illustrative non-limiting diagram illustrating a specific example for performing mini game processing.
FIG. 17 shows an exemplary illustrative non-limiting diagram illustrating winning and losing determination processing.

Referring to FIG. 16, here, four operable characters are displayed and a mini race game in which each character runs to the goal is shown.

For example, by pressing a prescribed button of the controller corresponding to an operation of each character, the corresponding character moves. For example, it is assumed that a distance to move is different depending on the number of times of pressing the A button as the prescribed button.

In accordance with the number of times of pressing, each character runs on a race track 620 to the goal.

Then, a star is given in accordance with the order of arrival at the goal.

For example, the first place is given four stars, the second place is given two stars, the third place is given one star, and the fourth place is given zero star.

Though a mini game in which four operable characters compete against one another has been described in the present example, the game is not particularly limited to the mini game. Mini game processing by using one operable character may be performed, mini game processing in which a game is executed with a plurality of operable characters cooperating with each other may be performed, and various mini games can be executed.

Referring to FIG. 17, here, the number of stars acquired and the ranking based on the winning and losing determination processing based on the possessed star data are shown.

Specifically, a case where the number of stars acquired by character A is 20, the number of stars acquired by character B is 18, the number of stars acquired by character C is 10, and the number of stars acquired by character D is 2 is shown.

Then, a case where the ranking was determined based on the number of acquired stars is shown.

Though a case where a game proceeds with four characters participating in has been described in the present example, the number of characters is not particularly limited as such and any number of characters may be set.

Though a case where the number of cells through which a character moves is determined by using a die has been described in the present example, any means may be employed so long as it can determine the number of cells through which movement is made, without particularly limited to the die. For example, the number of cells through which movement is made may be determined based on a value set as roulette turns and stops. In addition, the number of dice is not limited to one either, and dice can also be used.

<Other Forms>

Though game device 12 has been exemplified as a representative example of an information processing apparatus in the embodiment described above, the information processing apparatus is not limited thereto. Namely, an application executable by a personal computer may be provided as a program. Here, the program may be incorporated as a partial function of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A device for playing a game in which a plurality of player characters move on a prescribed route in a game space displayed on a display, comprising:

an information processing device including one or more processing units configured to perform functions and operates as:

an indication acceptance unit that accepts a movement indication for determining an amount of player character movement on said prescribed route directed to a player character among said plurality of player characters;

a movement amount determination unit that determines an amount of player character movement on said prescribed route when said indication acceptance unit accepts the movement indication;

a position updating unit that updates positions of said player character for which the movement indication has been accepted and of all other player characters on said prescribed route in accordance with said amount of player character movement determined by said movement amount determination unit;

an item acquirement/loss processing unit that performs processing by which player characters acquire or lose a prescribed item in accordance with an update of a position of said player character for which said movement indication has been accepted;

an event processing unit that executes an event at least on said player character for which the movement indication has been accepted in accordance with the position to which said player character has been moved; and a win/loss processing unit that performs a win/loss determination in which winning and losing is determined for player characters based on an amount of said prescribed items acquired by each of said plurality of player characters;

wherein said indication acceptance unit further operates as:

a normal movement indication determiner that accepts a normal movement indication for determining an amount of player character movement of a type that is a normal movement for a player character in the game, wherein said normal movement indication corresponds to a value of a cast shown by using a normal die, and a special movement indication determiner that accepts a special movement indication for determining an amount of player character special movement which is of a type that is different from said type that is a normal movement for a player character in the game, the special movement indication being used as an alternative to said normal movement indication and for which a number of permitted times of usage by each of said plurality of player characters is limited, and wherein said special movement indication corresponds to a value of a cast shown by using a special die different from said normal die.

2. The device according to claim 1, wherein
said amount of player character movement is the number of cells provided successively on said prescribed route, through which movement is made.

3. The device according to claim 1, wherein
said event processing unit includes a special indication acquirement processing unit that executes an event allowing use of said special movement indication of which number of permitted times of issuance is set as limited.

4. The device according to claim 1, wherein said special die is set to show only a value within a prescribed range narrower than a range of values determined by said normal die.

5. The device according to claim 1, wherein said special die is set to be able to show a value not included in the values determined by said normal die.

6. The device according to claim 1, wherein said special die is set to show only a value of zero.

7. The device according to claim 1, wherein
said event processing unit further includes a mini game processing unit that executes a mini game in which said plurality of player characters compete against one another as they are operated.

8. A computer implemented method using an information processing system having one or more processors for playing a game in which a plurality of player characters move on a prescribed route in a game space displayed on a display, the method comprising:
using the processing system to accept a movement indication for determining an amount of player character movement on said prescribed route directed to a player character among said plurality of player characters;
using the processing system to determine an amount of player character movement on said prescribed route when the movement indication is accepted;
using the processing system to update positions of said player character for which the indication has been accepted and of all other player characters on said prescribed route in accordance with a determined amount of player character movement;
using the processing system to perform item acquirement/loss processing by which player characters acquire or lose a prescribed item in accordance with an update of a position of said player character for which said movement indication has been accepted;
using the processing system to execute an event at least on said player character for which the indication has been accepted in accordance with the position to which said player character has been moved; and
using the processing system to perform a win/loss determination in which winning and losing is determined for player characters based on an amount of said prescribed items acquired by each of said plurality of player characters;
wherein accepting a movement indication further includes:
accepting a normal movement indication for determining an amount of player character movement of a type that is a normal movement for a player character in the game, wherein said normal movement indication corresponds to a value of a cast shown by using a normal die, and
accepting a special movement indication for determining an amount of player character special movement which is of a type that is different from said type that is a normal movement for a player character in the game, the special indication being used as an alternative to said normal movement indication and for which a number of permitted times of usage by each of said plurality of player characters is limited, and wherein said special movement indication corresponds to a value of a cast shown by using a special die different from said normal die.

9. A non-transitory storage medium encoded with a computer readable program instructions executable by one or more computer processor of an information processing system, the system being usable for playing a game in which a plurality of player characters move on a prescribed route in a game space displayed on a display, said program instructions comprising:
instructions for accepting a movement indication for determining an amount of movement on said prescribed route directed to a player character among said plurality of player characters;
instructions for determining an amount of player character movement on said prescribed route when the movement indication is accepted;
instructions for updating positions of said player character for which the movement indication has been accepted and of all other player characters on said prescribed route in accordance with a determined amount of player character movement;
instructions for performing item acquirement/loss processing by which player characters acquire or lose a prescribed item in accordance with an update of a position of said player character for which said movement indication has been accepted;
instructions for executing an event at least on said player character for which the movement indication has been accepted in accordance with the position to which said player character has been moved; and
instructions for performing a win/loss determination in which winning and losing is determined for player characters based on an amount of prescribed items acquired by each of said plurality of player characters;
wherein instructions for accepting a movement indication further include:
instructions for accepting a normal movement indication for determining an amount of player character movement of a type that is a normal movement for a player character in the game, wherein said normal movement indication corresponds to a value of a cast shown by using a normal die, and
instructions for accepting a special movement indication for determining an amount of player character special movement which is of a type that is different from said type that is a normal movement for a player character in the game, the special indication being used as an alternative to said normal movement indication and for which a number of permitted times of usage by each of said plurality of player characters is limited, and wherein said special movement indication corresponds to a value of a cast shown by using a special die different from said normal die.

10. A system which performs processing for playing a game in which a plurality of player characters move on a prescribed route in a game space displayed on a display, comprising:
a game device; and
a controller for operating the game device,
said game device including one or more processing units configured to function or operate as:
an indication acceptance unit that accepts a movement indication from said controller for determining an amount of player character movement on said prescribed route directed to a player character among said plurality of player characters, a movement amount determination unit that determines an amount of player character movement on said prescribed route when said indication acceptance unit accepts the indication, a position updating unit that updates positions of said player character for which the indication has been accepted and of all other player characters on said prescribed route in accordance with said amount of player character movement determined by said movement amount determination unit, an item acquirement/loss processing unit that performs processing by which player characters acquire or lose a prescribed item in accordance with an update of a position of said player character for which said movement indication has been accepted;

an event processing unit that executes an event at least on said player character for which the movement indication has been accepted in accordance with the position to which said player character has been moved; and a win/loss processing unit that performs a win/loss determination in which winning and losing is determined for player characters based on an amount of prescribed items acquired by each of said plurality of player characters;

wherein said indication acceptance unit further operates as:

a normal movement indication determiner that accepts a normal movement indication for determining an amount of player character movement of a type that is a normal movement for a player character in the game, wherein said normal movement indication corresponds to a value of a cast shown by using a normal die, and a special movement indication determiner that accepts a special movement indication for determining an amount of player character special movement which is of a type that is different from said type that is a normal movement for a player character in the game, the special movement indication being used as an alternative to said normal movement indication and for which a number of permitted times of usage by each of said plurality of player characters is limited, and wherein said special movement indication corresponds to a value of a cast shown by using a special die different from said normal die.

* * * * *